Nov. 21, 1961  L. F. BLATT  3,009,694
TOGGLE CLAMP
Filed Sept. 19, 1960  2 Sheets-Sheet 2
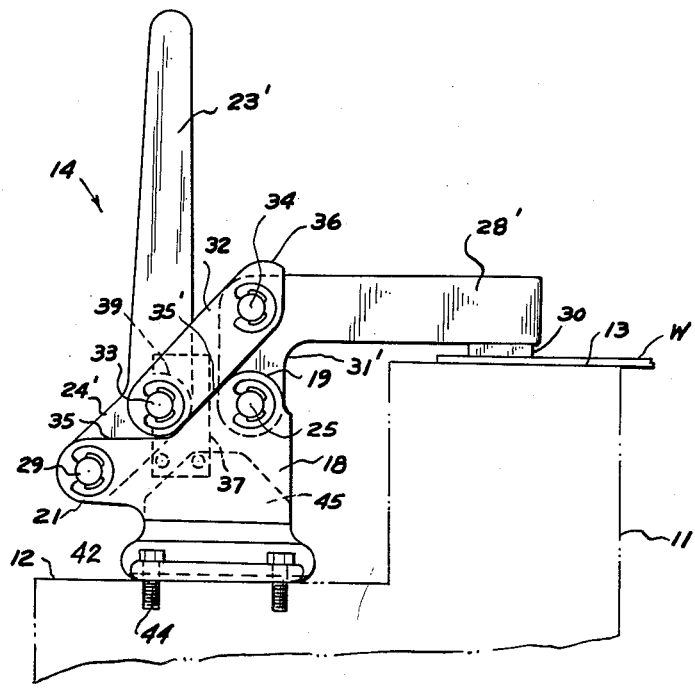
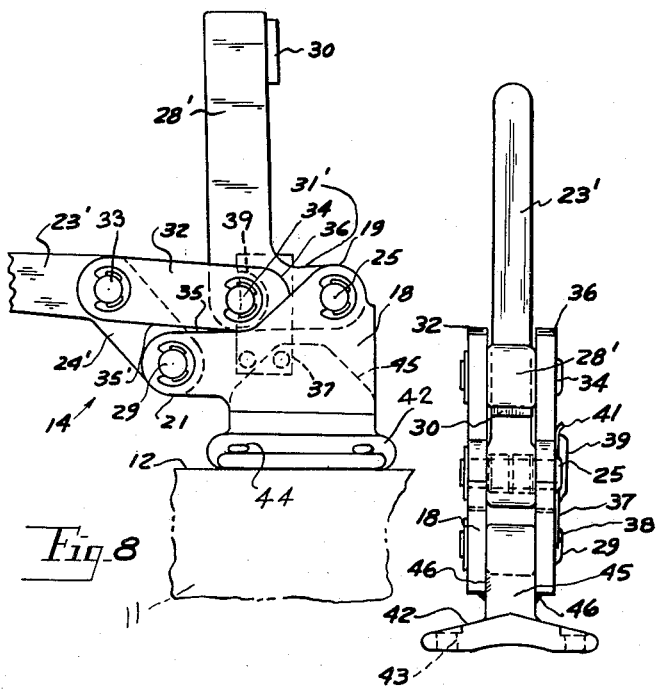
INVENTOR.
LELAND F. BLATT
BY
Robert A. Sloman
ATTORNEY

United States Patent Office 3,009,694
Patented Nov. 21, 1961

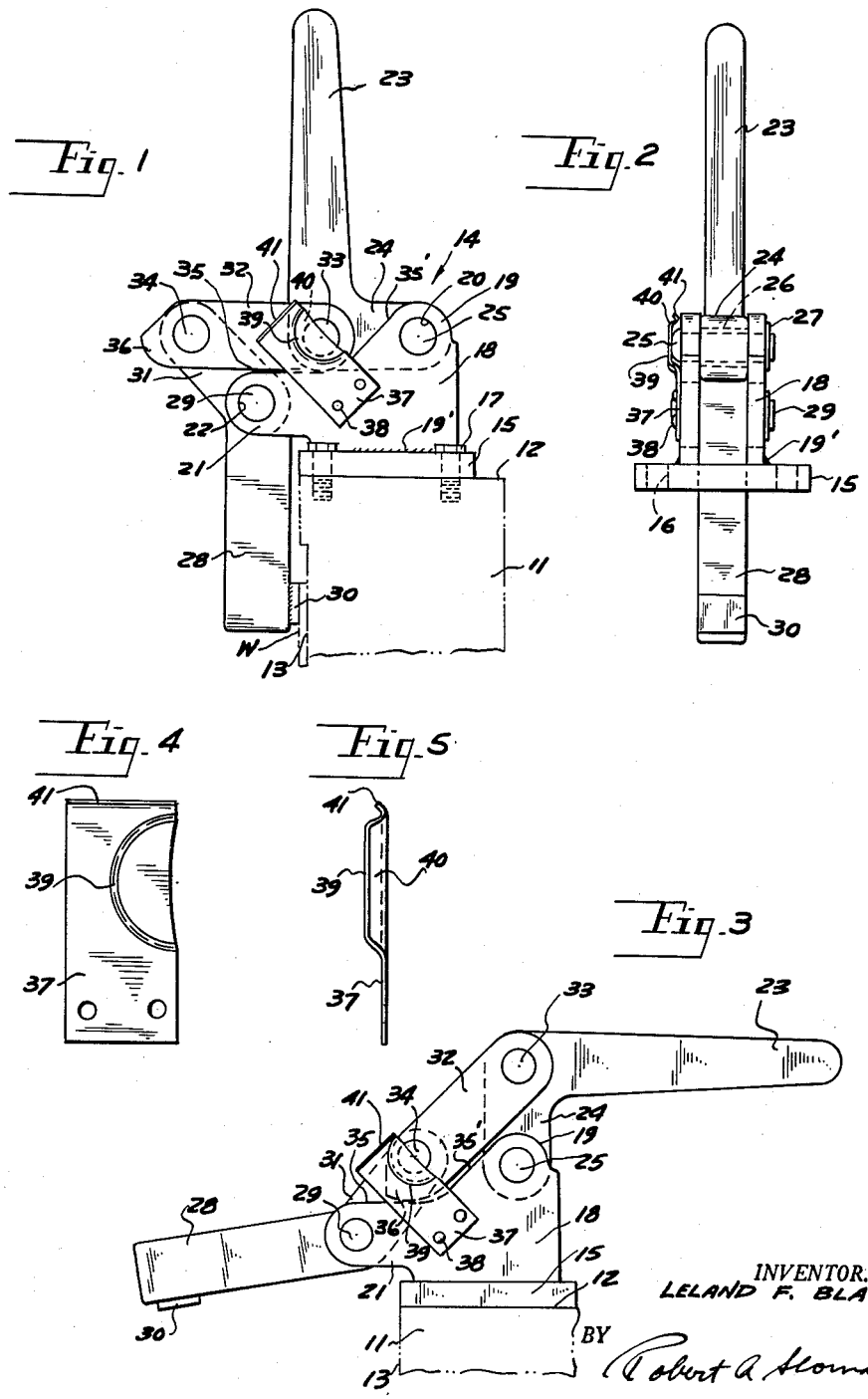

3,009,694
TOGGLE CLAMP
Leland F. Blatt, 22930 Sherwood Ave., Warren, Mich.
Filed Sept. 19, 1960, Ser. No. 56,787
3 Claims. (Cl. 269—90)

This invention relates to toggle clamps and more particularly to a novel form of toggle clamp construction.

Heretofore, particularly in machine tool industry, and in the use of dies and fixtures and wherein it is important for fixedly securing a part with respect to a bracket or a pair of parts with respect to each other for further machining or welding operation, various types of clamps have been employed.

It is the object of the present invention to provide a novel form of toggle clamp which incorporates a pair of parallel spaced upright base plates fixedly secured to a supporting base, in turn adapted for mounting upon a bracket or fixture, and wherein there is a control arm pivotally mounted between the said base plates adjacent one end thereof, and a workpiece retaining arm pivotally mounted between said upright base plates adjacent its opposite end and together with a pair of links whose ends are respectively arranged on opposite sides of the handle and operating arm and pivotally connected thereto to provide and effective toggle clamping mechanism.

It is an object of the present invention to provide a toggle clamp assembly together with a linkage incorporating means for prevening the toggle clamp for locking in "release" position, but so constructed as to lock when in work securing position.

It is another object of the present invention to provide a spring type of retainer upon the toggle clamp for retaining the parts in release position against accidental dislodgment.

It is a further object of the present invention to provide a special form of linkage between the handle and operating arm which is so constructed as to permit the locking of the toggle clamp in work securing position, and the retaining of the clamp unlocked when in work release position.

These and other objects will be seen from the following specification and claims in conjunction with the appended drawings in which:

FIG. 1 is a side elevational view of a toggle clamp in work securing position.

FIG. 2 is a right end elevational view thereof.

FIG. 3 is a view similar to FIG. 1 showing the parts in release position.

FIG. 4 is a front elevational view of the spring retainer alone shown in FIG. 1, but on an enlarged scale.

FIG. 5 is an end elevational view thereof.

FIG. 6 is a side elevational view of a slightly different form of the present toggle clamp with the pivotal mountings of the handle and operating arm in reversed position with respect to FIG. 1 and with the said operating arm in work securing position.

FIG. 7 is a right end elevational view thereof.

FIG. 8 is a fragmentary view of the clamp of FIG. 6 in "release position."

It will be understood that the above drawings illustrate merely a preferred embodiment of the invention, and that other embodiments are contemplated within the scope of the claims hereinafter set forth.

Referring to the drawings, and particularly, FIGS. 1 through 5, the present toggle clamp is adapted for mounting upon a suitable fixture or other support 11, fragmentarily shown, including a top supporting surface 12 and a right angularly related work receiving surface 13 against which the workpiece W to be clamped is positioned and shown retained, as in FIG. 1.

The present toggle clamp, generally indicated at 14 in FIG. 1, is shown in work securing position and includes the horizontally disposed base 15 having a series of apertures 16 and receiving the holddown fasteners 17 which project into the support 11 for fixedly securing the present toggle clamp in position thereon.

The present toggle clamp also includes a pair of upright parallel spaced base plates 18 whose bottom horizontal edges bear upon plate 15 and are fixedly secured thereto as by the welds 19'.

Base plates 18 at their one ends have their uprights 19 transversely aperture at 20. The opposite ends of said base plates have the lateral extensions 21 transversely apertured at 22. Handle 23 has a right angular extension 24 at one end which is arrange between uprights 18 and pivotally mounted thereon by means of the pivot pin 25 which extends through the base plate 18 and through the bushing 26, FIG. 2 within the handle extension 24. The opposite end of the pivot pin 25 extends through the corresponding opposing base plate 18 and is fixedly secured by the snap ring 27 in a conventional manner.

Each of the pivotal mountings hereafter described include a corresponding headed pivot pin as above described and shown in FIG. 2.

The operating arm 28 is pivotally connected intermediate its ends as by the pivot pin 29 which extends across the lateral extensions 21 of the said base plates.

The operating arm 28 is pivoted between the respective base plates 18 and pivotally connected therewith in the same manner as above described with respect to pivot pin 25, there being a suitable bushing fixedly positioned within the central portion of the operating arm 28 to receive the pivot pin 29 and for the purpose of minimizing wear.

Work engaging finger 30 is fixedly secured as by welds to an interior free end portion of the operating arm 28 and is adapted to operatively and retainingly engage workpiece W with respect to the upright surface 13 of the base 11.

Operating arm 28 has an angular extension 31 which projects angularly upward with respect to the base plate extensions 21. A pair of parallel spaced links 32 are arranged with their respective opposite ends upon opposite sides of the handle 23 and the operating arm extension 31. The one ends of the links 32 are pivotally connected by a pivot pin 33 to intermediate portions of the handle 23. The respective opposite ends of the links 32 are pivotally connected to the arm extensions 31 as by the pivot pins 34.

Referring to FIG. 1, the upper forward edges of the extensions 21 have horizontal top surfaces 35 which terminate in the upwardly inclined surfaces 35' which merge with the upright extensions 19.

In the work securing position of FIG. 1, the links 32 are respectively coplanar with the upright base plates 18 with the undersurfaces of the said links overlying substantially the horizontal surfaces 35, forming a part of said upright base plates.

In the release position of the toggle clamp shown in FIG. 3, said links 32 extend along and are in substantial registry with the inclined surfaces 35' forming a part of said upright base plates.

Referring to FIG. 1 in the locked position of the clamp it is seen that the pivot 33 has moved past dead center with respect to the pivots 25 and 34 and that accordingly toggle clamp is locked in work securing position. The greater the force tending to open the work engaging arm 28, the tighter the device remains clamped.

In order to release the work engaging arm 28 it is first necessary to rotate the handle 23 a short distance in a clockwise direction so as to elevate the pivot point 33 above dead center with respect to pivots 25 and 34.

Continual rotation of the handle 23 from the position shown in FIG. 1 to the position shown in FIG. 3 places the parts in the release position shown.

The construction of the handle and arm and links is such that during movement to a released position the pivot 34 might normally move past dead center with respect to pivots 33 and 29 which would cause the toggle clamp to lock in released position. If it is desirous that the clamp not lock in release position, a means is employed for preventing the pivot point 34 from passing said dead center position.

For this purpose, at one end of the respective links 32 and adjacent one side of the longitudinal center line thereof there is provided a boss 36 which is so constructed and arranged that as the parts are rotated to the release position shown in FIG. 3, the said boss 36 operatively engages a portion of the top surface 35 of the corresponding base plate to thus actually prevent the pivot point 34 from passing dead center with respect to the pivot centers 33 and 29. Accordingly the toggle clamp does not lock in release position.

In many situations, however, under this condition, there is a possibility that the work engaging arm 28 may have a tendency to rotate towards closed position, i.e., in a counter-clockwise direction with respect to pivot 29. This could result in damage to a workpiece or injure somebody. Accordingly, there is provided as a part of the present invention a flexible retainer plate, which is generally indicated at 37, being a plate of spring steel of general rectangular form, which as shown in FIGS. 1 and 3, is mounted upon one of the upright base plates 18 and fixedly secured thereto in the angular position shown as by the fasteners 38.

In the work engaging position shown in FIG. 1, the clamp retainer performs no particular function.

Referring to FIGS. 4 and 5 there is formed adjacent the free end of the flexible retainer plate 37 an outwardly projecting semi-circular recessed portion 39 defining a semi-circular recess 40. Further the flexible retainer plate 37 has a transverse upturned cam edge 41 which is engaged by the head of the pivot pin 34 as the toggle clamp assembly is rotated from the locked position of FIG. 1 to the release position of FIG. 3.

The head of the pivot pin 34 cams against the cam surface or lip 41 on the free edge of the flexible retainer plate 37 normally flexing the same outwardly sufficient to permit the pivot pin head 34 to pass thereunder and to retainingly nest as shown in FIG. 3 within the semi-circular recess 40 defined by the arcuate displaced portion 39.

In operation as the handle 23 is rotated from the position shown in FIG. 1 to the position shown in FIG. 3, the head of the pivot pin 34 initially cams against the lip 41 of the retainer plate 37 flexing the same sufficiently to permit the said head of the pivot pin to pass beyond said lip and to retainingly nest within the recess 40, defined upon one side of the retainer plate 37, all as shown in FIG. 3.

The inherent resiliency of the retainer plate 37 will thus actually retain frictionally the parts in the release position shown in FIG. 3 against accidental dropping of the work engaging arm 28 from the position shown.

In order to release the operating arm 28 from the retaining position shown in FIG. 3, it is merely necessary to apply a slight force in a counterclockwise direction to the end of the arm 28 which causes the head of the pivot pin 34 to cam against the edge portion adjacent the lip 41 flexing the retainer plate outwardly sufficiently so as to release the said pivot pin 34 therefrom. Thus the retainer plate serves the important purpose of retaining the clamp elements in the release position shown in FIG. 3, particularly against accidental dislodgment.

While fasteners 38 have been shown for securing the retainer plate 37 in the angular position indicated, it is contemplated that any other means of fastening may be employed, such as welding or the like.

The slight variation of the present invention is shown in FIGS. 6 and 7 wherein actually the same type of toggle clamp is employed and wherein similar numbers indicate the corresponding parts. For example, the upright base plates 18 are the same with the uprights 19 and the lateral extensions 21. There is also shown a base 11 with a support surface 12 and with a work engaging surface 13 upon which the workpiece W is mounted.

The handle 23' corresponds to the handle 23 in FIG. 1 and is different therefrom only that the extension 24' is arranged at an obtuse angle with respect to the handle base instead of the right angle shown in FIG. 1. Another difference is that the free end of the handle extension 24' is positioned between the extensions 21 of the base plates and pivotally connected thereon by pivot pin 29.

It is noted that the difference in this construction and that shown in FIG. 1 is that in FIG. 1 the end portion of the handle extension 24 is pivotally connected between the uprights 19. This merely shows that in the present construction the handle 23 may be pivotally mounted between the spaced plates 18 at either end depending upon the particular clamping problem involved.

The work engaging arm 28' corresponds to the work engaging arm 28, FIG. 1 and differs therefrom only that the extension 31' is arranged at right angles thereto, whereas there is an obtuse angular relationship shown in FIG. 1 between the arm 28 and its extension 31.

The free end of the extension 31' is pivotally mounted between the uprights 19 of the base plates 18 by means of the pivot pin 25 corresponding to the pivot pin 25 of FIG. 1. Here also the work engaging arm 28' is pivotally mounted at the opposite end of the base plates from that shown in FIG. 1 to further indicate the fact that the work engaging arm may be mounted on either end of the base plates 18.

FIG. 6 illustrates the position of the parts in work securing position. To release the clamp of FIG. 6 the handle 23' is rotated up to 90 degrees in a counterclockwise direction to the position shown in FIG. 8. There is also employed in FIG. 6, as well as FIG. 7, a similar flexible retainer plate 37 which, because of the relationship to the parts is mounted in an upright position and secured to one of the upright base plates 18, as by the fasteners 38, FIG. 7.

There is also defined in the said retainer plate 37 the laterally displaced semi-circular portion 39 to define the recess 40, FIG. 5, which is adapted to receive the head of the pivot pin 34 when the work retaining arm 28' has been rotated to release position. This will have the effect of retaining the parts in release position somewhat similar to what is shown in FIG. 3, the operation being exactly the same and further discussion thereof is omitted.

Another difference between the structure shown in FIG. 6 and that shown in FIG. 1 is that a different type of base plate, or support plate, is provided. In FIG. 1 there is shown a horizontally disposed base 15 secured to the top surface of the base or support 11 as by the fasteners 17.

In FIG. 6, there is employed a base 42 with apertures 43 receiving fasteners 44, FIG. 6, which project down into the support 11 for securing to the surface 12. The base 42 includes the centrally arranged upright column 45 which is snugly positioned between the base plates 18 and fixedly secured thereto as by welding, for illustration, as shown at 46, FIG. 7. One advantage of this type of construction is that there may be established an angular relationship between the standard 45 and the base plates 18 other than what is shown in FIG. 6, after which the standard 45 is fixedly secured to the base plates 18.

In any event, the operation of the toggle clamps is exactly the same as above described in detail with respect to FIGS. 1 through 5.

The respective links 32 also have the bosses 36 adjacent their one ends and upon one side of their respective longitudinal center lines. In the illustration shown in FIG. 6, the boss or cam surface 36 is positioned upwardly so that even in the "release" position of the toggle clamp shown it appears that the device will lock. This is because the cams 36 will be out of engagement with the top edges 35 or 35' of the base plates 18.

Should it be desired in FIG. 6, for example, to rearrange the links 32 so that the device would not lock in release position, all that is necessary is to temporarily remove the pivot pins 33—34 and rotate the respective links 32 180 degree about their longitudinal axes. This would position the cam or boss 36 in a lowermost position so as to operatively engage the upper edge surfaces of the base plates 18 when the respective parts have been rotated to a release position. This would in effect prevent the pivot point 34 from moving past dead center with respect to pivot points 25 and 33, when in the released position.

The same thing is true with respect to FIG. 3. Should it be desired to provide for the locking of the toggle clamp in the release position shown in FIG. 3, all that is necessary is to rotate each of the links 32 180 degrees about its respective longitudinal axis. This would move the boss 36 upwardly with respect to the position shown in FIG. 3 so as to be inactive when the parts are in release position. This would permit the pivot point 34 to move past dead center with respect to the pivot points 33 and 29 and the toggle clamp would lock in release position, should this be desired under some circumstances.

Having described the invention, reference should now be had to the following claims.

I claim:
1. A toggle clamp comprising a base adapted for mounting upon a support, parallel spaced upright base plates secured to said base, a cantilever handle with one end guidably positioned between and engaging said plates adjacent one edge thereof and pivotally mounted thereon, an operating cantilever arm guidably positioned between and engaging said plates adjacent another edge thereof and pivotally mounted thereon, one end of said operating arm adapted to retainingly engage a workpiece relative to said support, a pair of parallel spaced links arranged upon and engaging opposite sides of said operating arm and handle and at their opposite ends pivotally joined respectively to portions of said arm and handle spaced from their respective pivotal mountings upon said base plates, the respective pivotal mountings of said handle, operating arm and links, including headed pins, and a flexible retainer plate secured to one of said base plates at one end with its upper end projecting above said base plate, a laterally displaced arcuate recessed portion formed in said retainer plate, said retainer plate terminating in a cam surface, rotation of said operating arm to release position causing a headed pin between said arm and said links to cam against said retainer cam surface flexing the same with said headed pin retainingly nested within the recess defined within said retainer plate for fixedly retaining the parts in "release" position.

2. A toggle clamp comprising a base adapted for mounting upon a support, a pair of parallel spaced base plates upon said base and secured thereto, a cantilever handle with its end guidably positioned between and engaging said plates adjacent one edge thereof, and pivotally mounted thereon, an operating cantilever arm guidably positioned between and engaging said plates adjacent another edge thereof and pivotally mounted thereon, one end of said operating arm adapted to retainingly engage a workpiece relative to said support, a pair of parallel spaced links arranged upon and engaging opposite sides of said operating arm and handle and at their opposite ends pivotally joined respectively to portions of said arm and handle spaced from their respective pivotal mountings on said base plates, the pivotal connection between said links and arm on pivotal movement of said handle to "release" position lying in advance of dead center of a line between the respective pivotal connection of said links with said handle and the pivotal connection of said arm with said base plates preventing the arm from locking in release position, and a flexible retainer plate mounted upon one of said base plates and projecting thereabove, said retainer plate being formed so as to frictionally and retainingly engage the pivotal connection between said links and work engaging arm when in released position to prevent accidental dislodgement thereof.

3. A toggle clamp comprising a base adapted for mounting upon a support, a pair of parallel spaced base plates upon said base and secured thereto, a cantilever handle with its end guidably positioned between and engaging said plates adjacent one edge thereof and pivotally mounted thereon, an operating cantilever arm guidably positioned between and engaging said plates adjacent another edge thereof and pivotally mounted thereon, one end of said operating arm adapted to retainingly engage a workpiece relative to said support, a pair of parallel spaced links arranged upon and engaging opposite sides of said operating arm and handle and at their opposite ends pivotally joined respectively to portions of said arm and handle spaced from their respective pivotal mountings on said base plates, the pivotal connection between said links and arm on pivotal movement of said handle to "release" position lying in advance of dead center of a line between the respective pivotal connection of said links with said handle and the pivotal connection of said arm with said base plates preventing the arm from locking in release position, and a flexible retainer plate mounted upon one of said base plates and projecting upwardly above the top thereof, said retainer plate adjacent its free end having an offset recessed portion of substantially semi-circular shape terminating at its outer edge in a cam surface, the pivotal connection between said links and operating arm including a pivot pin having a head, said cam surface on movement of the parts to release position being operatively engaged by said pivot pin head, and with said pivot pin head being retainingly engaged and received by said recessed portion in full release position against accidental dislodgement therefrom.

References Cited in the file of this patent

UNITED STATES PATENTS

| 1,910,833 | Hippey | May 23, 1933 |
| 2,386,567 | Olson | Oct. 9, 1945 |
| 2,436,941 | Sendoykas | Mar. 2, 1948 |
| 2,835,291 | Blatt et al. | May 20, 1958 |